April 24, 1956   G. J. PEPPER   2,743,040
COMBINED SALT AND PEPPER SHAKER
Filed June 8, 1953

INVENTOR.
Guy J. Pepper

:::: {.columns}
::: {.column}
United States Patent Office 2,743,040
Patented Apr. 24, 1956

2,743,040

COMBINED SALT AND PEPPER SHAKER

Guy J. Pepper, Seattle, Wash.

Application June 8, 1953, Serial No. 360,065

4 Claims. (Cl. 222—142.4)

This application is concerned with a salt and pepper shaker in one unit so that the salt can be distributed from one part of the shaker and pepper from another. The shaker comprises a molded vertical container divided by a reinforcing rib into two chambers with the openings through which the comminuted solids pass molded into the upper part of the chambers. The upper end of the reinforcing rib is formed into an extension which is threaded to receive a screwed-on closure.

An object of this invention is the making of a salt and/or pepper shaker without having to drill holes or openings through which the comminuted solids are shaken. This is achieved by molding the shaker and during the step of molding forming the holes or openings in the shaker.

Another object is the making of a closure for the shaker which can be screwed on. This closure may be of an irregular shape or configuration and still can be screwed on a shaker to give a close fit.

A further object is the making of a salt and/or pepper shaker which can be easily cleaned. Upon removal of the closure access to the chambers is unobstructed.

Various other and ancillary objects and advantages of the present invention, will, with the foregoing, become apparent from the following description and explanation of the present invention.

The invention consists in the novel construction and adaptation and combination of parts hereinafter described.

Figure 1:
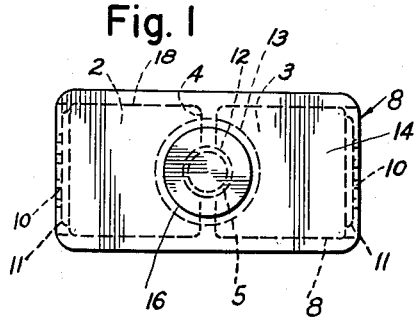
Figure 1 is a top plan view of the salt and pepper shaker showing the preferred teaching and construction of this shaker.
Figure 2:
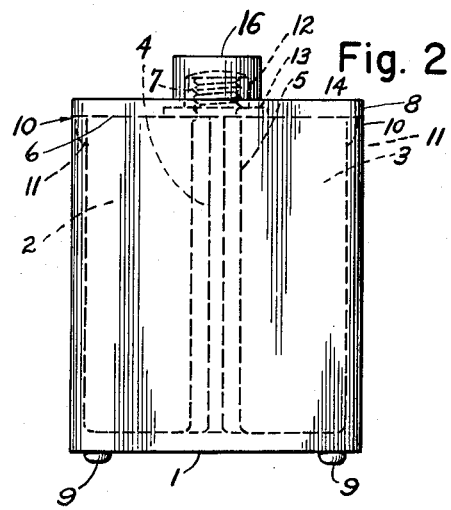
Fig. 2 is a side elevational view of the shaker.
Figure 3:
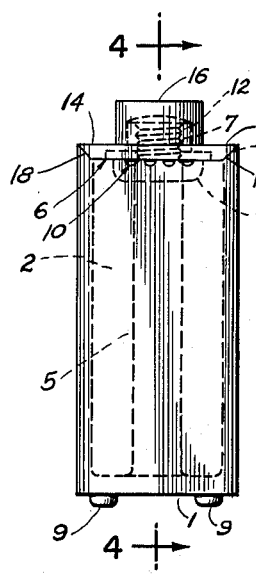
Fig. 3 is an edge elevational view of the shaker.
Figure 4:
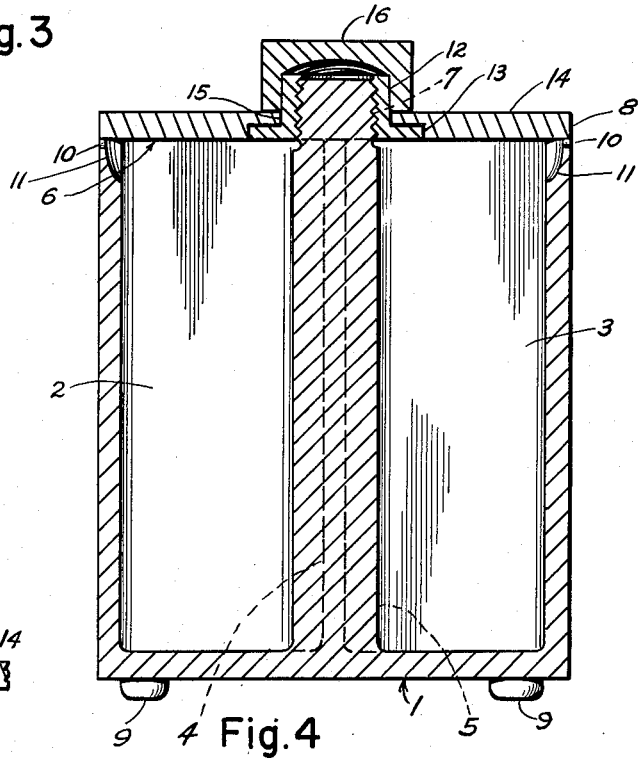
Fig. 4 is a longitudinal vertical sectional view drawn to an enlarged scale on line 4-4 of Fig. 3.

This shaker comprises essentially a vertical container 1 divided into two chambers 2 and 3 by a reinforcing rib 4. Part of this rib is in the form of a post or rod 5 protruding above the upper edges 6 of the shaker to form an extension 7. Such extension is externally threaded. At or near the top of the walls are pour-openings 10 which allow the salt or pepper to be distributed. Near these pour-openings and leading to them are recesses 11 substantially reducing the thickness of the wall in the particular area of the pour-openings so as to minimize any liability of these openings becoming clogged. From an inspection of Fig. 3, it will be seen that the two side edges rise above the end edges and are bevelled on the inner face. The side edges of the cover plate 14 are correspondingly bevelled and this guides the cover plate
:::
::: {.column}
into position as the cover plate, in a manner hereinafter to be described, is screwed onto the body of the shaker. Fig. 4 clearly shows that with closure 8 removed the chambers 2 and 3 can easily be washed and cleaned. Although the shaker is featured as having legs 9 it is to be clearly understood that they can be replaced with some other form of support or else be eliminated without affecting its novel features.

Figure 5:
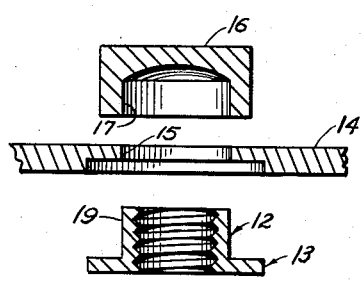
Fig. 5 is an exploded vertical sectional view of the three elements composing the closure.

The closure 8 for the shaker comprises three separate pieces which have been assembled so as to be able to be screwed on the extension 7. Fig. 5 is an exploded illustration of the three elements of the closure which are a threaded cylinder 12 with a flange 13 at the lower end, the cover plate 14, and a hollow cap 16. The cover plate 14 has an opening 15 of such size as to slip over the exterior surface of cylinder 12 but not to clear the periphery of flange 13 which assures that the cover can rest on the upper surface of this flange. The hollow cavity 17 of the cap 16 is arranged to fit the neck portion 19 of the cylinder 12. These three elements are assembled by first fitting the cover plate 14 over the cylinder 12 and then placing cap 16 on the exposed neck of this cylinder so that cover 14 is caught between flange 13 and cap 16. The cylinder 12 and cap 16 are cemented together to form an integral unit, leaving sufficient clearance between the upper surface of flange 13 and the lower surface of cap 16 to allow cover 14 to rotate independently of this integral unit.

The container, which is the body of the shaker, particularly adapts itself to a molding operation and is inexpensive to produce in that the openings 10 and recess 11 can be formed in the molding operation. The shaker is especially suited to the use of clear plastics.

The invention and the manner of its use should be clear from the foregoing description of my preferred illustrated embodiment. Changes in the details of construction may be resorted to without departing from the spirit of the invention and I accordingly intend that no limitations are to be implied and that the hereto annexed claims will be given a scope fully commensurate with the broadest interpretation to which the employed language admits.

What I claim is:

1. A shaker comprising a container, a reinforcing rib serving as a party wall dividing the container into two chambers, a central portion of said rib projecting upwardly beyond the container proper in the form of a threaded stud, a closure mechanism for said container, said closure mechanism comprising: an internally threaded cylinder with a circular flange near one end, a cover plate rotatably fitting over the cylinder and bearing against the flange, and a cap fitting over and fixedly secured to the cylinder so as to establish a captive grip upon the cover plate.

2. A closure mechanism comprising an internally threaded cylinder having a flange near one end, a cover plate fitting over the cylinder, and a cap fitting over the cylinder and catching the cover plate between it and the flange, said cap being rigidly secured to the cylinder, said cap and cylinder being rotatable independently of said cover plate.

3. A closure mechanism comprising a cylinder having a flange near one end, a cover plate fitting over the cylinder and a cap fitting over the cylinder and catching the cover plate between it and the flange, said cap being rigidly secured to the cylinder, said cap and cylinder being rotatable independently of said cover plate.
:::
::::

4. A shaker comprising an open-top container, party wall dividing the container into two chambers, notches in the top edges of the exterior walls of said chambers, recesses in the chamber side of said exterior walls, said recesses leading to the notches, a closure for said open top of the container, and said closure and said notches in combination forming pour-openings.

References Cited in the file of this patent

UNITED STATES PATENTS

| | | |
|---|---|---|
| 1,316,480 | Harris | Sept. 16, 1919 |
| 1,342,524 | Ament | June 8, 1920 |
| 1,671,163 | Plante | May 29, 1928 |
| 1,704,829 | Grubman | Mar. 12, 1929 |
| 1,792,916 | MacLellan | Feb. 17, 1931 |
| 2,075,281 | Hall | Mar. 30, 1937 |
| 2,158,044 | Haller | May 9, 1939 |
| 2,224,852 | Lowry | Dec. 17, 1940 |
| 2,232,475 | Renfrew et al | Feb. 18, 1941 |
| 2,566,004 | Von Duyke | Aug. 28, 1951 |

FOREIGN PATENTS

| | | |
|---|---|---|
| 607,716 | Great Britain | Sept. 3, 1948 |